(12) United States Patent
Ragland

(10) Patent No.: US 6,305,299 B1
(45) Date of Patent: Oct. 23, 2001

(54) CAR SEAT SNACK TRAY

(76) Inventor: Jacie Laverne Ragland, 10257 Camerino Ct., Sacramento, CA (US) 95829

(*) Notice: Subject to any disclaimer, the term of this patent is extended or adjusted under 35 U.S.C. 154(b) by 0 days.

(21) Appl. No.: 09/182,735

(22) Filed: Oct. 28, 1998

(51) Int. Cl.⁷ .................................................. A47B 37/00
(52) U.S. Cl. ...................................... 108/44; 220/592.23
(58) Field of Search ........................... 220/574.2, 592.28, 220/592.23; 2/49.3, 49.1; 108/25, 43, 44

(56) References Cited

U.S. PATENT DOCUMENTS 1,881,873 * 10/1932 Newcomb .......................... 220/574.2
2,353,383 * 7/1944 Bartsch .............................. 220/574.2

* cited by examiner

*Primary Examiner*—Peter M. Cuomo
*Assistant Examiner*—Jerry A. Anderson

(57) ABSTRACT

A vehicular child seat tray system is provided including a base with at least one slot formed therein for receiving a restraining strap therein. Also included is a tray removably coupled to the base. Various other items may be attached to the base for facilitating feeding and entertaining a child.

4 Claims, 7 Drawing Sheets

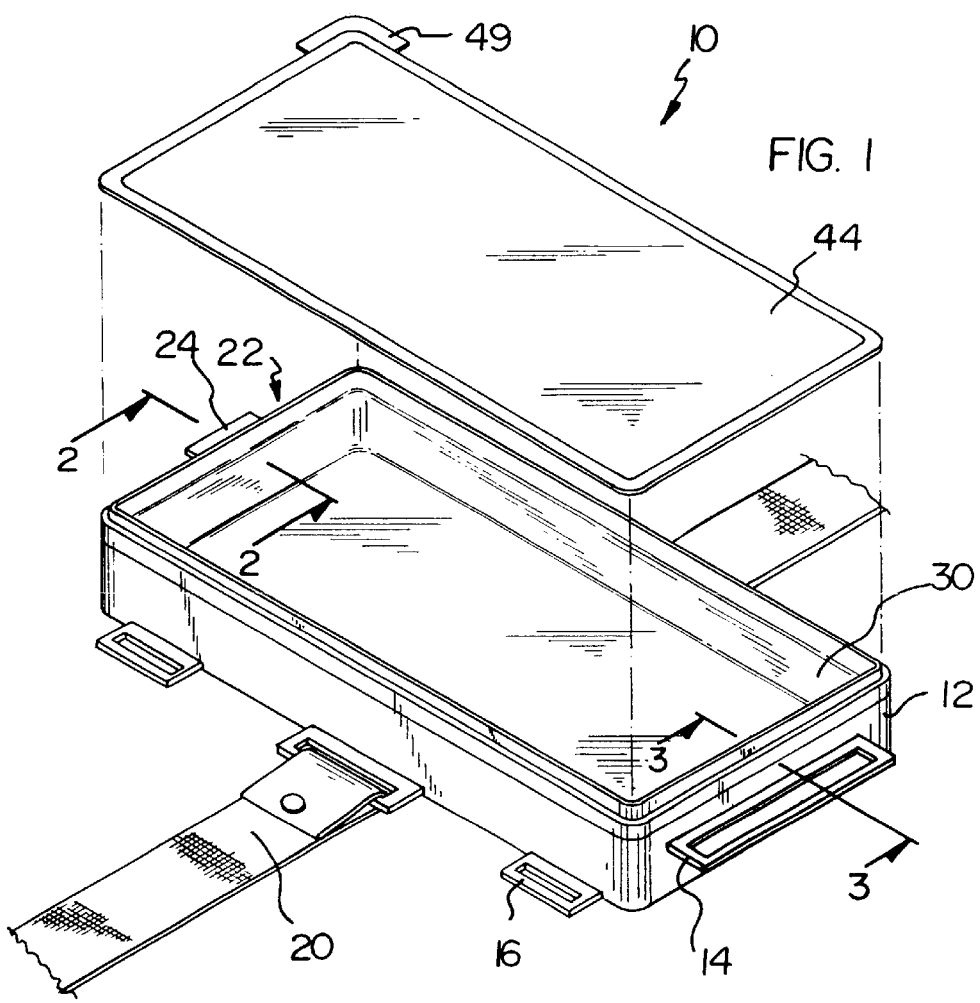
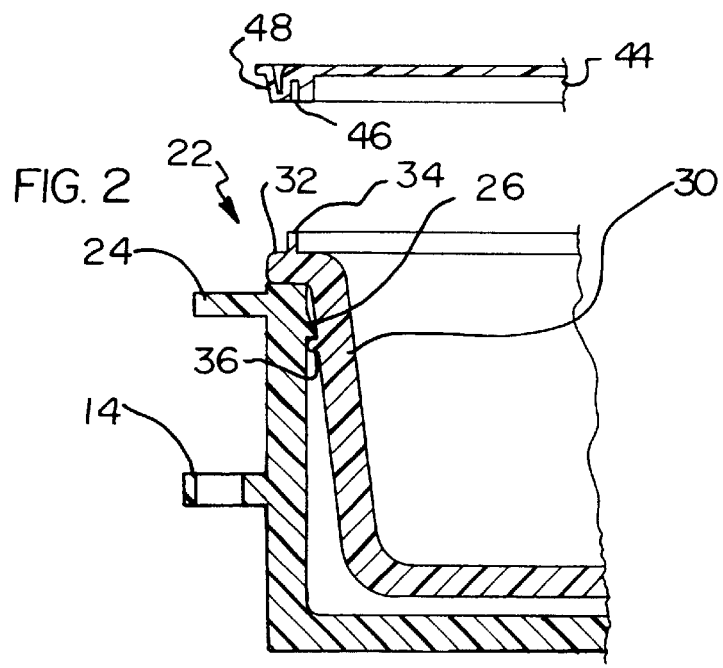

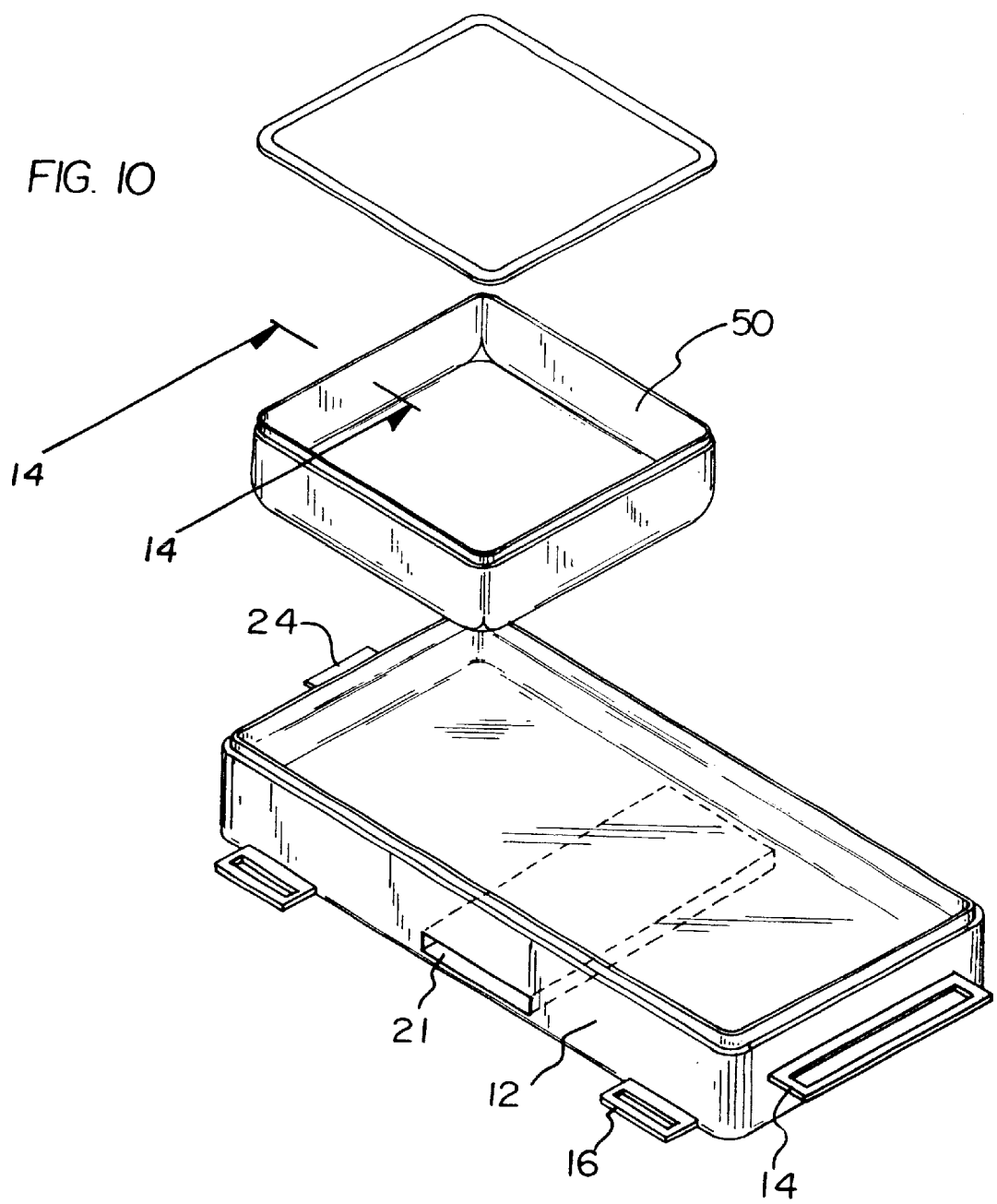
FIG. 10
FIG. 11
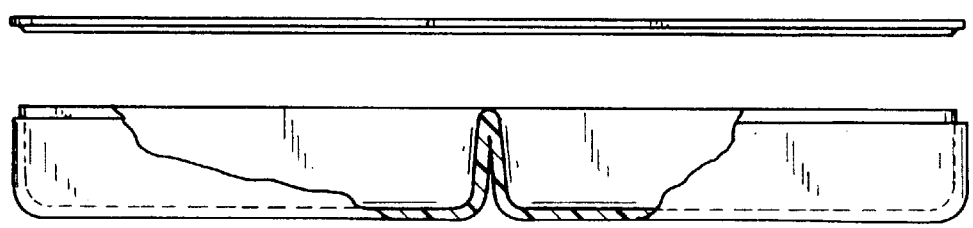

CAR SEAT SNACK TRAY

BACKGROUND OF THE INVENTION

1. Field of the Invention

The present invention relates to vehicle child seats and more particularly pertains to a new car seat snack tray for feeding and entertaining a child within a vehicle.

2. Description of the Prior Art

The use of vehicle child seats is known in the prior art. More specifically, vehicle child seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,662,378; U.S. Pat. No. 4,906,043; U.S. Pat. No. 3,785,300; U.S. Pat. No. 5,381,901; U.S. Pat. No. 2,533,527; and U.S. Pat. Des. 351,738.

In these respects, the car seat snack tray according to the present invention substantially departs from the conventional concepts and designs of the prior art, and in so doing provides an apparatus primarily developed for the purpose of feeding and entertaining a child within a vehicle.

SUMMARY OF THE INVENTION

In view of the foregoing disadvantages inherent in the known types of vehicle child seats now present in the prior art, the present invention provides a new car seat snack tray construction wherein the same can be utilized for feeding and entertaining a child within a vehicle.

The general purpose of the present invention, which will be described subsequently in greater detail, is to provide a new car seat snack tray apparatus and method which has many of the advantages of the vehicle child seats mentioned heretofore and many novel features that result in a new car seat snack tray which is not anticipated, rendered obvious, suggested, or even implied by any of the prior art vehicle child seats, either alone or in any combination thereof.

To attain this, the present invention generally comprises a base with a planar rectangular bottom face and a peripheral side wall integrally coupled to a periphery of the bottom face and extending upwardly therefrom in perpendicular relationship therewith. As such, an interior space, an open top, and an upper peripheral edge are defined. The side wall is defined by a pair of elongated side faces and a pair of short end faces. The base further includes a pair of elongated slotted tabs integrally coupled to the short end faces thereof and extend therefrom at an elevation common with the upper peripheral edge. Associated therewith are three short slotted tabs each equally spaced along one of the elongated side faces of the base. The three short slotted tabs each remain at an elevation common with the bottom face of the base. Note FIGS. 1 & 10. A first one of the short end faces of the base includes a latch portion having an outwardly extending grip. As shown in FIG. 2, the latch portion further includes a top inwardly extending member adjacent the upper peripheral edge. FIG. 3 shows that a second one of the short end faces of the base has a bottom inwardly extending member adjacent to the bottom face of the base. Also included is a tray having a planar rectangular bottom face with a size less than that of the base. As can best be shown in FIGS. 2 & 3, and a side wall of the tray extends upwardly and outwardly from the bottom face of the tray to define an interior space, an open top, and an upper peripheral edge. FIG. 13 shows the tray having a peripheral lip extending outwardly from the upper peripheral edge which in turn has an upwardly extending peripheral flange for reasons that will soon become apparent. The side wall of the tray is defined by a pair of elongated side faces and a pair of short end faces. A first one of the short end faces of the tray has a top outwardly extending member for engaging the top inwardly extending member of the base. Similarly, a second one of the short end faces of the tray has a bottom outwardly extending member for engaging the bottom inwardly extending member of the base. As shown in FIG. 13, the bottom face of the tray has a downwardly extending peripheral protrusion. As an option, the tray is hollowed to define a closed interior for containing a liquid temperature medium. Note FIG. 14. FIG. 2 shows the flexible lid of the present invention which has a planar rectangular configuration with a periphery defined by a peripheral slit and a peripheral grip having a V-shaped crosssection along an entire periphery thereof. The peripheral slit is adapted to frictionally receive the upwardly extending peripheral flange of the tray during use. FIG. 10 shows a plurality of bowls removably positioned within the base. Such bowls each have a length about ½ that of the base. It should be noted that the bowls have removable covers. FIGS. 12 & 13 depict a removable suction platform including an upper sleeve for removably and frictionally engaging the peripheral protrusion of the tray. The suction platform is equipped with a lower suction skirt for creating a vacuum coupling with a recipient surface. With reference now to FIGS. 7–9, a coloring plate is provided having an intermediate planar rectangular portion and a peripheral lip having an inverted L-shaped cross-section along a length thereof. As best shown in FIG. 9, the peripheral lip is adapted for engaging the upper peripheral edge of the base such that the intermediate planar portion resides at a plane beneath that of the upper peripheral edge. The intermediate planar portion includes a first thin elongated plate having an inboard edge integrally coupled to the intermediate planar portion and extending upwardly and inwardly toward a center of the coloring plate. Associated therewith is a wide rectangular recess formed along a short end edge of the intermediate planar portion. As shown in FIG. 5, a playing station is provided including a rectangular block with a pair of elongated side faces and a pair of short end faces. A first one of the short end faces of the block of the playing station has a top outwardly extending member for engaging the top inwardly extending member of the base. A second one of the short end faces of the block of the playing station has a bottom outwardly extending member for engaging the bottom inwardly extending member of the base. This structure is similar to that of the tray. The playing station further has a pair of stanchions positioned along a longitudinal bisecting line of the block. A slotted guide is mounted between top ends thereof for allowing the sliding of a toy therealong. Finally, a bib is constructed from a flexible, impermeable material. Such bib has a generally square configuration with a generally convex top edge, a linear bottom edge and a pair of side edges tapering from the bottom edge to the top edge of the bib. The bib includes a pair of neck straps each mounted to opposite side edges of the bib and extending therefrom in continual relationship with the top edge of the bib. The bib further includes a pair of mounting fasteners each coupled to the opposite ends of the bottom edge of the bib. The mounting fasteners each have a pair of spaced snap couples thereon for allowing the coupling thereof onto the short slotted tabs of the base. The side edges of the bib have arcuate ears which extend outwardly therefrom for directing food toward the bottom edge of the bib.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new car seat snack tray apparatus and method which has many of the advantages of the vehicle child seats mentioned heretofore and many novel features that result in a new car seat snack tray which is not anticipated, rendered obvious, suggested, or even implied by any of the prior art vehicle child seats, either alone or in any combination thereof.

It is another object of the present invention to provide a new car seat snack tray which may be easily and efficiently manufactured and marketed.

It is a further object of the present invention to provide a new car seat snack tray which is of a durable and reliable construction.

An even further object of the present invention is to provide a new car seat snack tray which is susceptible of a low cost of manufacture with regard to both materials and labor, and which accordingly is then susceptible of low prices of sale to the consuming public, thereby making such car seat snack tray economically available to the buying public.

Still yet another object of the present invention is to provide a new car seat snack tray which provides in the apparatuses and methods of the prior art some of the advantages thereof, while simultaneously overcoming some of the disadvantages normally associated therewith.

Still another object of the present invention is to provide a new car seat snack tray for feeding and entertaining a child within a vehicle.

Even still another object of the present invention is to provide a new car seat snack tray that includes a base with at least one slot formed therein for receiving a restraining strap therein. Also included is a tray removably coupled to the base. Various other items may be attached to the base for facilitating feeding and entertaining a child.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new car seat snack tray according to the present invention.

FIG. 2 is a side cross-sectional view of the present invention showing the interconnection of the tray and the base.

FIG. 10 is an exploded view of the present invention showing the bowls thereof.

FIG. 11 is a side cross-sectional view of another embodiment of the tray of the present invention.

DESCRIPTION OF THE PREFERRED EMBODIMENT

Figure 3:
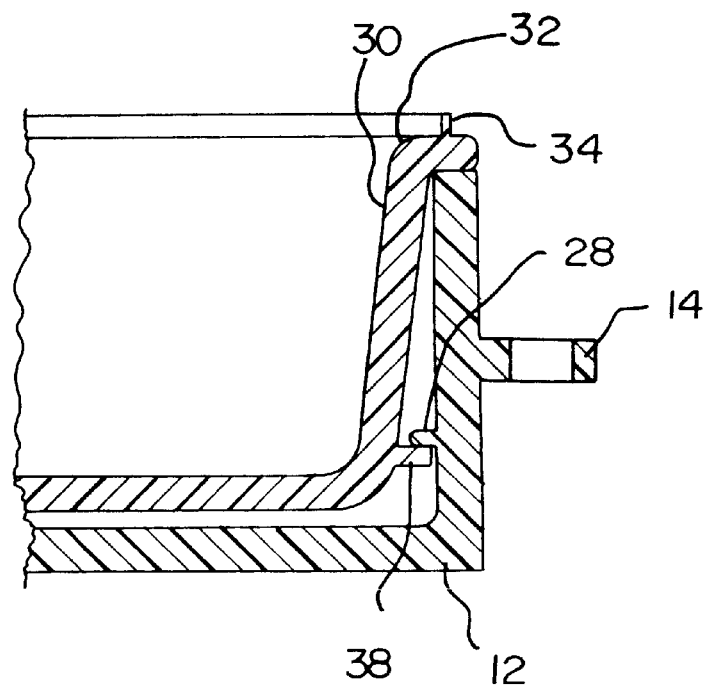
FIG. 3 is another cross-sectional view of the present invention showing the interconnection of the tray and the base.
Figure 4:
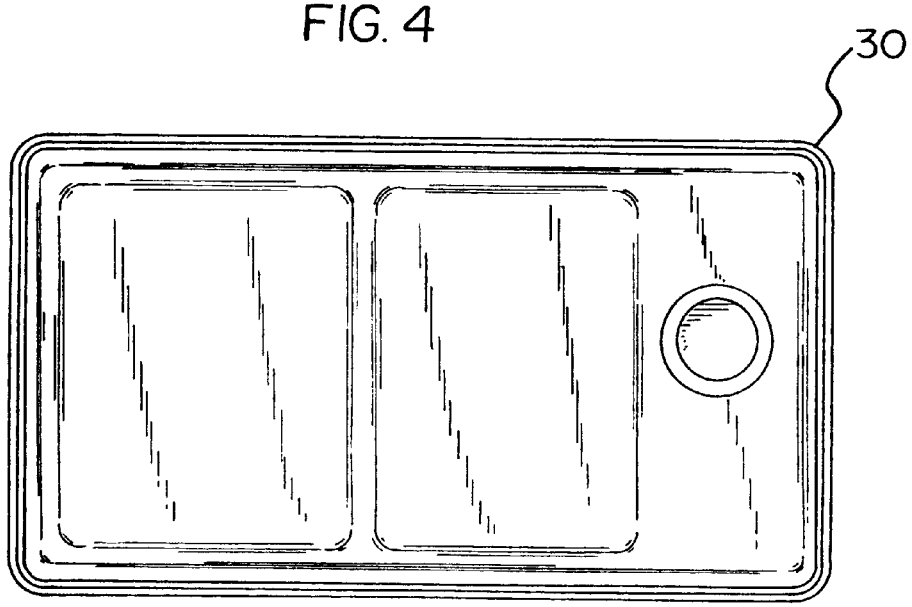
FIG. 4 is a top view of one embodiment of the tray of the present invention.

With reference now to the drawings, and in particular to FIGS. 1 through 15 thereof, a new car seat snack tray embodying the principles and concepts of the present invention and generally designated by the reference numeral 10 will be described.

The present invention, designated as numeral 10, includes a plastic base 12 with a planar rectangular bottom face and a peripheral side wall integrally coupled to a periphery of the bottom face and extending upwardly therefrom in perpendicular relationship therewith. As such, an interior space, an open top, and an upper peripheral edge are defined. The side wall is defined by a pair of elongated side faces and a pair of short end faces.

The base further includes a pair of elongated slotted tabs 14 integrally coupled to the short end faces thereof and extend therefrom at an elevation between a middle of the corresponding end face and an elevation common with the upper peripheral edge. The elongated slotted tabs are ideal for hanging toys upon. Associated therewith are three short slotted tabs 16 each equally spaced along one of the elongated side faces of the base. The three short slotted tabs each remain at an elevation common with the bottom face of the base. Note FIGS. 1 & 10.

A center one of the short slotted tabs is adapted for optional coupling with a strap 20 of a child vehicle seat. A quick release feature is preferably afforded by way of snap fasteners. Ideally, another center short slotted tab is mounted on an opposite elongated side face of the base for further coupling with another strap of the child vehicle seat. It should be noted that the aforementioned straps may be components of a crotch portion of a child restrain belt assembly or constitute stand alone straps. As shown in FIG. 10, a channel 21 may be formed in the bottom face of the base for slidably receiving the forgoing strap.

A first one of the short end faces of the base includes a latch portion 22 having an outwardly extending grip 24. As shown in FIG. 2, the latch portion further includes a top inwardly extending member 26 adjacent the upper peripheral edge. FIG. 3 shows that a second one of the short end faces of the base has a bottom inwardly extending member 28 adjacent to the bottom face of the base.

Figure 13:
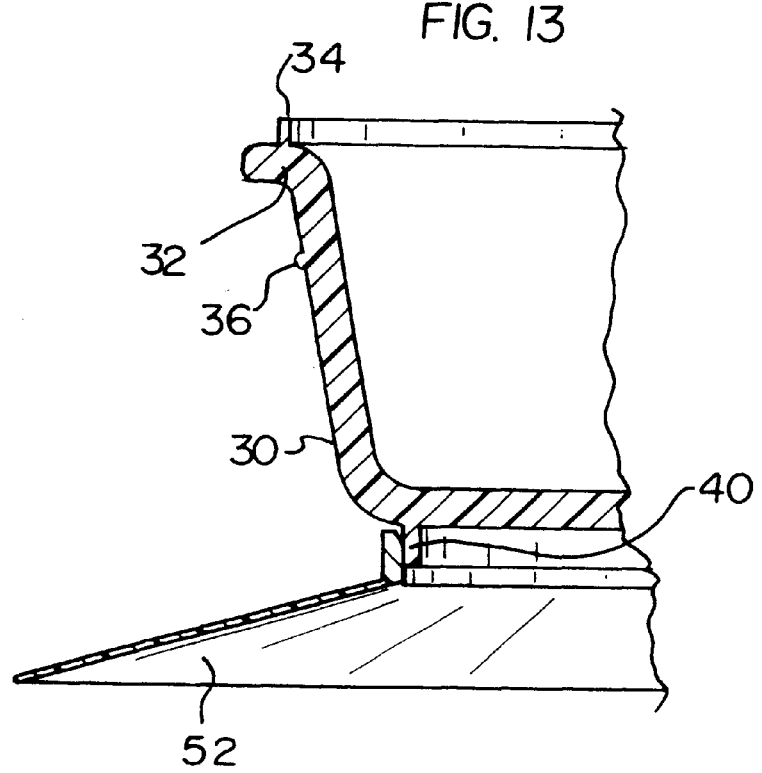
FIG. 13 is a cross-sectional view of the suction platform of the present invention taken along line 13—13 shown in FIG. 12.

Also included is a plastic tray 30 having a planar rectangular bottom face with a size less than that of the base. As can best be shown in FIGS. 2 & 3, a side wall of the tray extends upwardly and outwardly from the bottom face of the tray to define an interior space, an open top, and an upper peripheral edge. FIG. 13 shows the tray having a peripheral lip 32 extending outwardly from the upper peripheral edge which in turn has an upwardly extending peripheral flange 34 for reasons that will soon become apparent.

The side wall of the tray is defined by a pair of elongated side faces and a pair of short end faces. A first one of the short end faces of the tray has a top outwardly extending member 36 for engaging the top inwardly extending member of the base. Similarly, a second one of the short end faces of the tray has a bottom outwardly extending member 38 for engaging the bottom inwardly extending member of the base. It should be noted that the resiliency of the base allows the latch portion to be biased outwardly to releasably lock the tray therein. As shown in FIG. 13, the bottom face of the tray has a downwardly extending peripheral protrusion 40.

Figure 6:
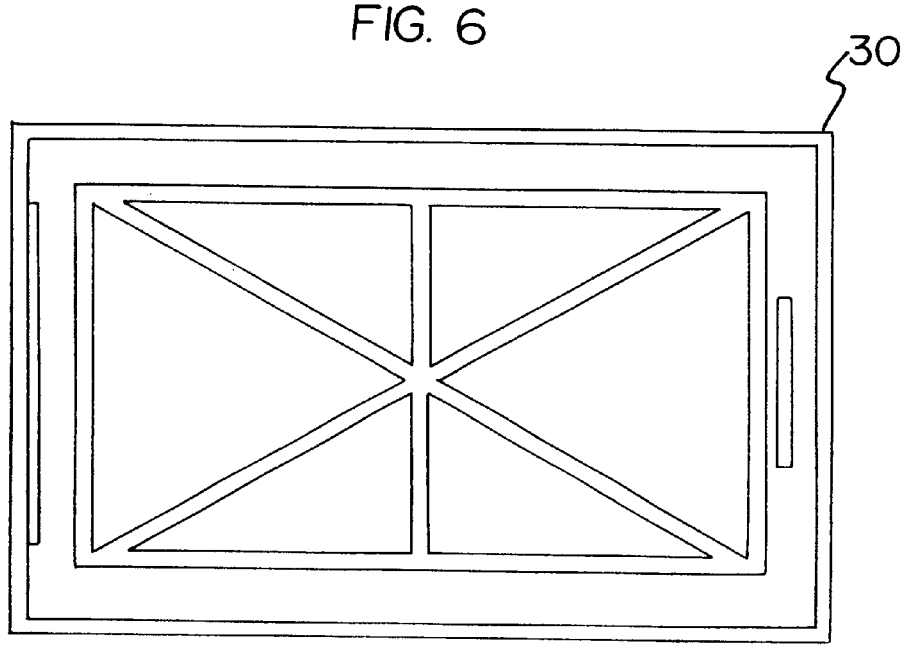
FIG. 6 is a bottom view of the tray of the present invention.

As an option, the tray is hollowed to define a closed interior for containing a liquid temperature medium 42. Note FIG. 14. Further options include strengthening the bottom face of the tray by providing integral ribs as shown in FIG. 6. Further, the tray may be divided via intermediate walls or equipped with drink holding recesses per the desires of the user. Note FIGS. 4 and 11. As such various food items and utensils may be stored and utilized in an organized manner.

FIG. 2 shows the flexible lid 44 of the present invention which has a planar rectangular configuration with a periphery defined by a peripheral slit 46 and a peripheral grip 48 having a V-shaped cross-section along an entire periphery thereof. The peripheral slit is adapted to frictionally receive the upwardly extending peripheral flange of the tray during use. In the preferred embodiment, a corner tab 49 extends from the lid for facilitating removal. Note FIG. 1.

Figure 14:
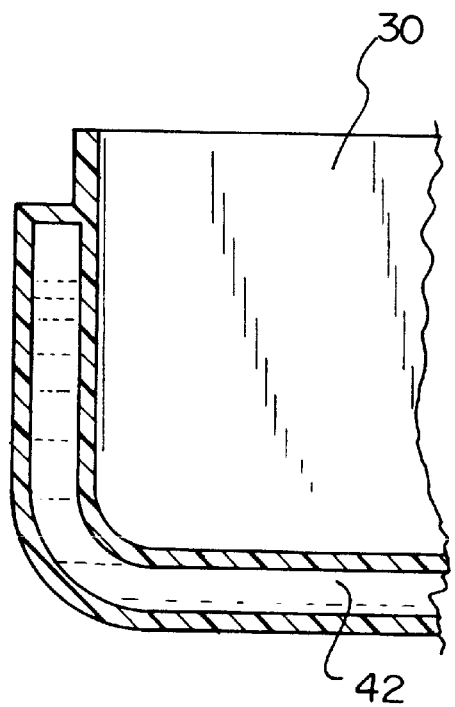
FIG. 14 is a cross-sectional view of another embodiment of the tray of the present invention.
Figure 15:
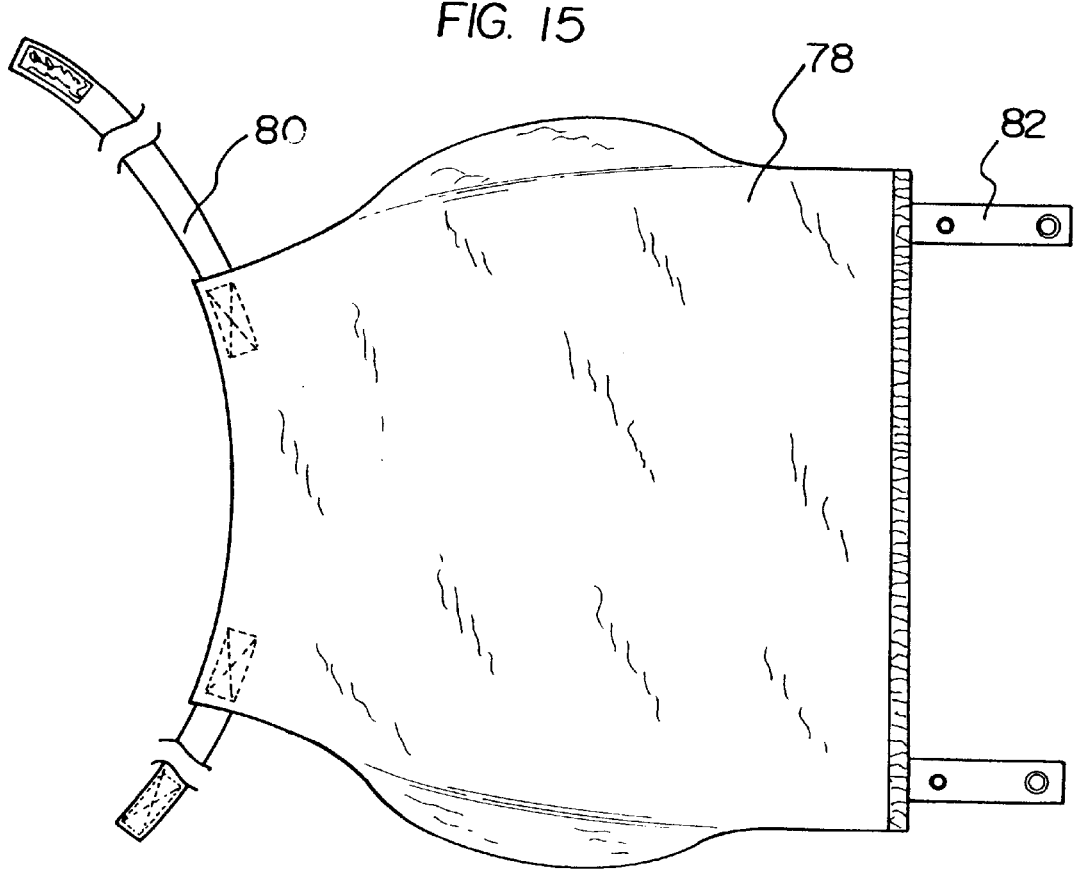
FIG. 15 is a top view of the bib of the present invention.

FIG. 10 shows a plurality of bowls 50 removably positioned within the base. Such bowls each have a length smaller than that of the base. It should be noted that the bowls also have removable covers. It should be noted that the bowls, similar to the tray, may be equipped with the liquid medium, as shown in FIG. 14.

Figure 12:
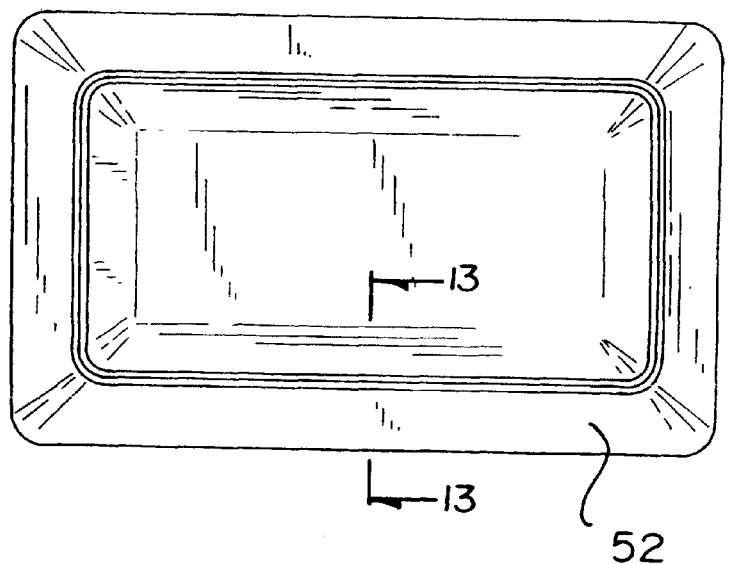
FIG. 12 is a top view of the suction platform of the present invention.

FIGS. 12 & 13 depict a removable suction platform 52 including an upper sleeve for removably and frictionally engaging the peripheral protrusion of the tray. The suction platform is equipped with a lower suction skirt for creating a vacuum coupling with a recipient surface.

Figure 7:
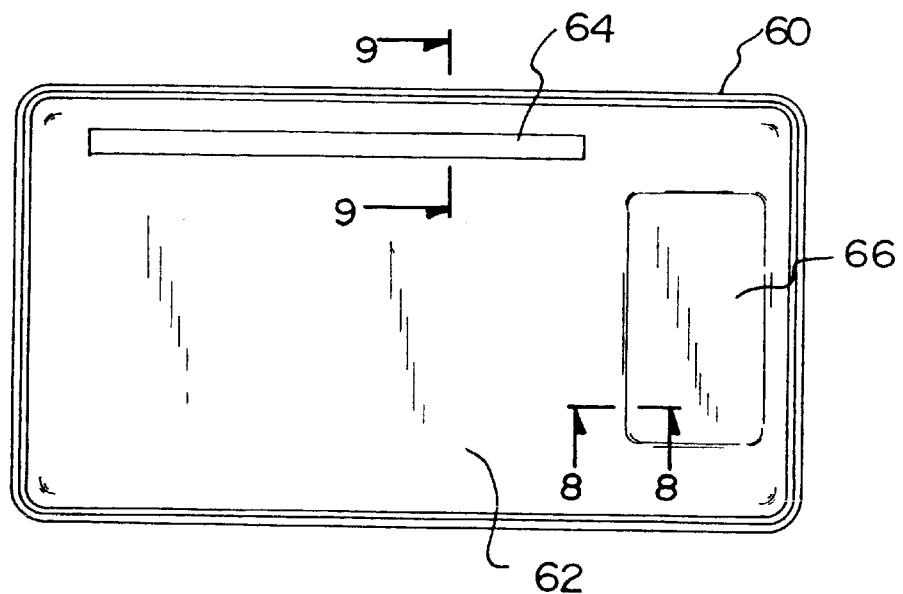
FIG. 7 is a top view of the coloring plate of the present invention.
Figure 8:
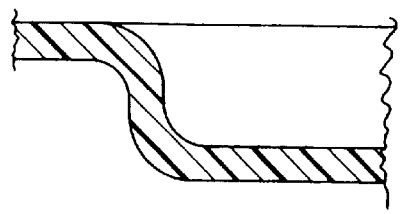
FIG. 8 is a cross-sectional view of the coloring plate taken along line 8—8 shown in FIG. 7.
Figure 9:
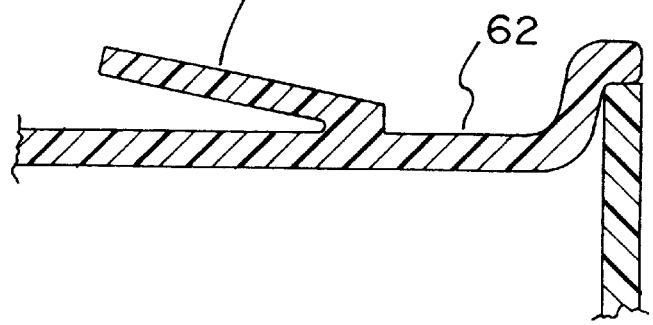
FIG. 9 is a side cross-sectional view of the coloring plate of the present invention taken along line 9—9 shown in FIG. 8.

With reference now to FIGS. 7–9, a coloring plate 60 is provided having an intermediate planar rectangular portion 62 and a peripheral lip having an inverted L-shaped cross-section along a length thereof. As best shown in FIG. 9, the peripheral lip is adapted for engaging the upper peripheral edge of the base such that the intermediate planar portion resides at a plane beneath that of the upper peripheral edge. The intermediate planar portion includes a first thin elongated plate 64 having an inboard edge integrally coupled to the intermediate planar portion and extending upwardly and inwardly toward a center of the coloring plate. Associated therewith is a wide rectangular recess 66 formed along a short end edge of the intermediate planar portion. The elongated plate acts as a clip for holding various books and writing material while the recess holds crayons and other writing utensils.

Figure 5:
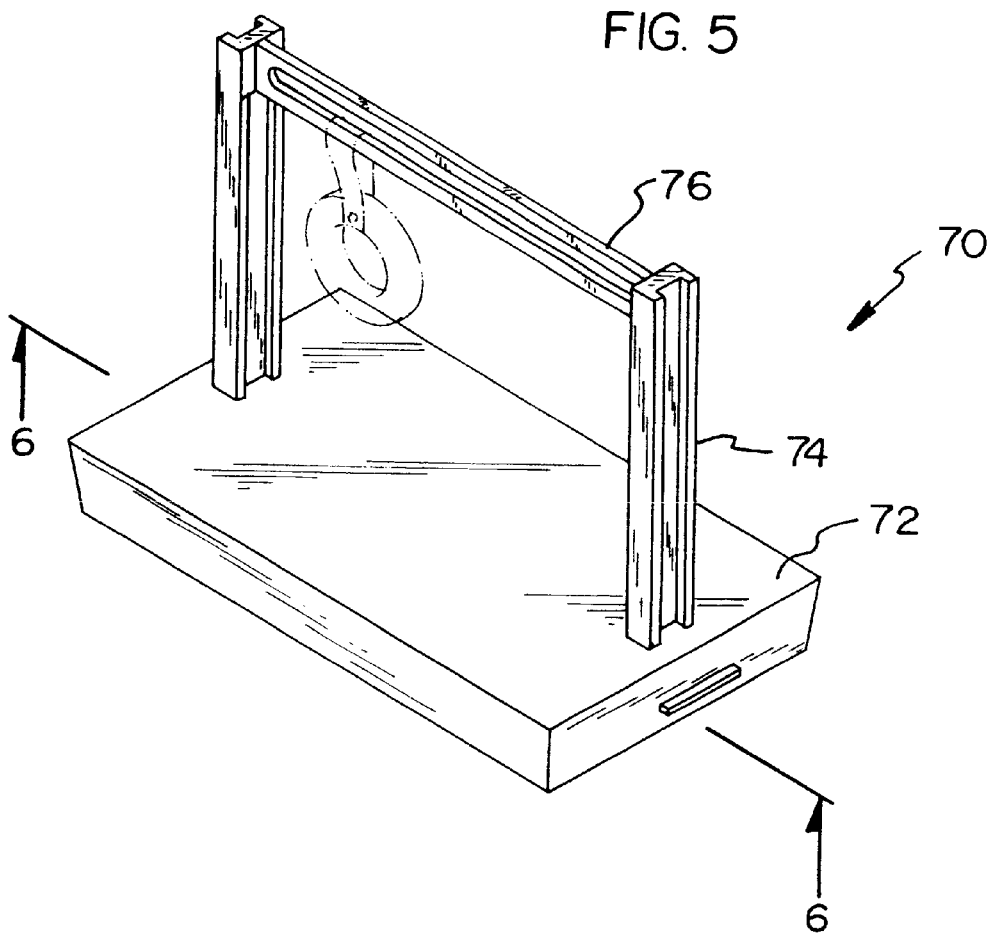
FIG. 5 is a perspective view of the playing station of the present invention.

As shown in FIG. 5, a playing station 70 is provided including a rectangular block 72 with a pair of elongated side faces and a pair of short end faces. A first one of the short end faces of the block of the playing station has a top outwardly extending member for engaging the top inwardly extending member of the base. A second one of the short end faces of the block of the playing station has a bottom outwardly extending member for engaging the bottom inwardly extending member of the base. This structure is similar to that of the tray. The playing station further has a pair of stanchions 74 positioned along a longitudinal bisecting line of the block. A slotted guide 76 is mounted between top ends of the stanchions for allowing the sliding of a toy therealong.

Finally, a bib 78 is constructed from a flexible, impermeable material. Such bib has a generally square configuration with a generally convex top edge, a linear bottom edge equipped with a resilient strip and a pair of side edges tapering from the bottom edge to the top edge of the bib. The bib includes a pair of neck straps 80 each mounted to opposite side edges of the bib and extending therefrom in continual relationship with the top edge of the bib. The neck straps are preferably equipped with Velcro ™ for coupling purposes. The bib further includes a pair of mounting fasteners 82 each coupled to opposite ends of the bottom edge of the bib. The mounting fasteners each have a pair of spaced snap couples thereon for allowing the coupling thereof onto the short slotted tabs of the base. In the preferred embodiment, the side edges of the bib have arcuate ears which extend outwardly therefrom for directing food toward the bottom edge of the bib.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular child seat tray system comprising:

a base with a planar rectangular bottom face and a peripheral side wall integrally coupled to a periphery of the bottom face and extending upwardly therefrom in perpendicular relationship therwith for define an interior space, an open top, and a n upper peripheral edge, the side wall defined by a pair of elongated side faces and a pair of short end faces, the base further including a pair of clongated slotted tabs interally coupled to the short end faces thereof and extending therefrom at an elevation common with the upper peripheral edge and three short slotted tabs each equally spaced along one of the elongated side faces of the base at an elevation common with the bottom face thereof, a first one of the short end faces including a latch having an outwardly extending grip and a top inwardly extending member adjacent the upper peripheral edge, wherein a second one of the short end faces of the base has a bottom inwardly extending member adjacent to the bottom face of the base;

a tray including a planar rectangular bottom face with a size less than that of the base and a side wall extending upwardly and outwardly from the bottom face of the tray to define an interior space, an open top, and an upper peripheral edge with a peripheral lip extending outwardly therefrom which in turn has an upwardly extending peripheral flange, the side wall of the tray defined by a pair of elongated side faces and a pair of short end faces, a first one of the short end faces of the tray having a top outwardly extending member for engaing the top inwardly extending member of the base and a second one of the short end faces of the tray having a bottom outwardly extending member for engaging the bottom inwardly extending member of the base, the bottom face of the tray having a downwardly extending peripheral protrusion, wherein the tray is hollowed to define a closed interior for containing a liquid temperature medium; and a flexible lid having a planar rectangular configuration with a periphery defined by a peripheral slit and a peripheral grip having a V-shaped cross-section along an entire periphery thereof, wherein the peripheral slit is adapted to frictionally receive the upwardly extending peripheral flange of the tray.

2. A vehicular child scat tray system comprising:

a base, at least one slot being formed in said base;

a tray removably coupled to the base;

a restraining strap removably inserted through said slot and tray relative to the base;

wherein said base further comprises a plurality of tabs, each of said tabs having the slot formed therein; and wherein a first pair of said plurality of tabs extends from a center portion of an exterior edge of a first side and a second side of said tray, wherein each of said sides of said tray are opposite each other, and a second pair of said plurality of tabs extends from each of a first end portion and a second end portion of a first side of said tray, and a third pair of said plurality of tabs extends from a center portion of each of a first end and a second end of said tray.

3. A vehicular child seat tray system as set forth in claim 2 wherein a lid is removably mounted on the tray.

4. A vehicular child seat tray system comprising:

a base with a bottom face and a peripheral side wall integrally coupled to a periphery of the bottom face and extending upwarldy therefrom in perpendicular relationship therwith for defining an interior space, an open top, and an upper peripheral edge, the side wall defined by a pair of side faces and a pair of end faces, the baser further including a pair of slotted tabs intergrally coupled to the end faces thereof and extending therefrom at an elevation common with the upper peripheral edge and three slotted tabs each equally spaced along one of the side faces of the base at an elevation common with the bottom face thereof, a first one of the end faces including a latch having an outwardly extending grip and a top inwardly extending member adjacent the upper peripheral edge, wherein a second one of the short end faces of the base has a bottom inwardly extending member adjacent to the bottom face of the base;

a tray including a bottom face and a side wall extending upwardly and outwardly from the bottom face of the tray to define an interior space, an open top, and an upper peripheral edge with a peripheral lip extending outwarldy therefrom which in turn has an upwardly extending peripheral flange, the side wall of the tray defined by a pair of side faces and a pair of end faces, a first one of the end faces of the tray having a top outwardly extending member for engaging the top inwardly extending member of the base and a second one of the end faces of the tray having a bottom outwardly extending member for engaging the bottom inwardly extending member of the base, the bottom face of the tray having a downwarldy extending peripheral protrusion, wherein the tray is hollowed to define a closed interior for containing a liquid temperature medium; and a flexible lid having a periphery defined by a peripheral slit and a peripheral grip having a cross-section along an entire periphery thereof, wherein the peripheral slit is adapted to frictionally receive the upwardly extending peripheral flange of the tray.

* * * * *